United States Patent [19]
Leuenberger

[11] 3,837,181
[45] Sept. 24, 1974

[54] ROTARY COUPLING DEVICE IN WHICH THE TRANSMITTED SPEED OF ROTATION IS INCREASED PROGRESSIVELY

[75] Inventor: Arthur-André Leuenberger, Geneve, Switzerland

[73] Assignee: Relma S. A., Geneva, Switzerland

[22] Filed: Dec. 12, 1972

[21] Appl. No.: 314,378

[30] Foreign Application Priority Data
Dec. 23, 1971  Switzerland.................... 18866/71

[52] U.S. Cl........................................ 64/26, 192/54
[51] Int. Cl. ...... F16d 3/80, F16d 7/00, F16d 43/20
[58] Field of Search.............. 192/54; 64/14, 24, 25, 64/26, 30 R

[56] References Cited
UNITED STATES PATENTS

| | | | |
|---|---|---|---|
| 1,315,848 | 9/1919 | Leissner................................. | 64/26 |
| 1,746,148 | 2/1930 | Eaton................................... | 64/26 X |
| 3,091,103 | 5/1963 | Goodwin................................ | 64/26 |
| 3,653,228 | 4/1972 | Tiberio ................................. | 64/26 |

FOREIGN PATENTS OR APPLICATIONS
2,053,456  4/1971  France

*Primary Examiner*—Samuel Scott
*Assistant Examiner*—Lance W. Chandler
*Attorney, Agent, or Firm*—Hobbs & Green

[57] ABSTRACT

A rotary coupling device in which the transmitted speed is increased progressively, of the type having a case and a shaft axially extending therein defining an annular chamber filled with fluid, at least one driving vane connected to rotate with a driving shaft and extending radially between the inner lateral wall of said chamber and the lateral wall of the axial shaft and axially between the two end walls of the case to form an inner partition wall in the annular chamber, and at least one corresponding driven vane connected to the driven shaft and forming an inner partition wall in said annular chamber. The two corresponding vanes divide the annular chamber into two complementary spaces, and the driven shaft is normally driven positively by the driving shaft by contact between the vanes.

10 Claims, 7 Drawing Figures

ROTARY COUPLING DEVICE IN WHICH THE TRANSMITTED SPEED OF ROTATION IS INCREASED PROGRESSIVELY

The present invention relates to a rotary coupling device in which the transmitted speed of rotation is increased progressively, of the type described in French Pat. No. 2,053,456 and which is adapted, in the event of sudden variations in the speed of rotation, and in particular reversal of the direction of rotation, of a shaft driving a kinematic chain or a mass having a relatively high inertia, to ensure a slowing down and then a progressive increase in the speed of rotation of the driven shaft, while maintaining the drive positive, that is to say, without slip of the driven shaft with respect to the driving shaft, whereby shocks harmful to the mechanism are avoided.

A device of this type comprises a case defining an inner volume of revolution, a shaft extending axially through said volume and defining in the latter an annular chamber filled with fluid, at least one vane, termed a driving vane, connected to rotate with the driving shaft and extending radially between the inner lateral wall of said chamber and the lateral wall of the axial shaft and axially between the two end walls of the case so as to form an inner partition wall in said annular chamber, at least one corresponding vane, termed driven vane, extending axially and radially in the same way as the driving vane and forming in the same way as the driving vane an inner partition wall in said annular chamber but connected to rotate with the driven shaft, the two corresponding vanes dividing said annular chamber into two complementary spaces, the normal positive driving of the driven shaft by the driving shaft being ensured by the contact of the vanes, whereas a sudden decrease in the speed of rotation of the driving shaft, for example the reversal of its direction of rotation, creates a depression in one of the spaces and a compression in the other with damping of the movement of the driven shaft. But in the aforementioned patent, the driving and the increase or gain in the speed of rotation of the driven elements were ensured solely through the medium of the damping fluid of the annular chamber, which is usually an incompressible fluid, for example oil, or a mixture of incompressible fluid and compressible fluid, for example oil and air.

Now, in systems employing an incompressible fluid, a correct increase or gathering of speed can be obtained only by means of a complex system having a variable opening for putting the complementary spaces of the annular chamber in communication.

In systems employing a mixture of incompressible fluid and compressible fluid, the proportion of the mixture is very difficult to control and very slight variations in this proportion produce very different results; the presence of the incompressible fluid results in the accumulation of a certain mass of liquid difficult to eliminate, which prevents the coupling from performing its positive driving function, and, owing to high temperatures, the mixture deteriorates and burns and thus produces deposits which adversely affect the operation of the coupling.

The present invention resides in employing, for overcoming these drawbacks, a compressible fluid and in principle air as the damping fluid and arranging the device in such manner that at least two corresponding surfaces, respectively related to the driving shaft and to the driven shaft, are provided, said surfaces coming into frictional contact with each other when the pressure in one of said complementary spaces reaches a given value.

By means of this arrangement, the compression of the fluid in one of the spaces of the annular chamber upon a sudden reduction in the speed of rotation of the driving shaft, and in particular the reversal of its direction of rotation, causes its surfaces to come into contact and consequently causes the driven part to be driven by friction with a progressive gathering of the speed of the driven part.

In a particular embodiment of the invention, the case is integral with the driving part and the surfaces adapted to come into frictional contact are constituted by the inner face of a transverse wall of the case and the outer face of a side wall which carries the driven vane and is slidably mounted on the driven shaft but keyed to rotate with the latter.

In the case where the coupling is intended to transmit high torques, it may be advantageous to multiply the surfaces of contact and for this purpose to provide, between the driven flange and the surface of the driving case a plurality of parallel discs which are alternately mounted to rotate with the driven shaft and with the case but are slidable with respect to the driven shaft and the case and thus afford a multidisc type clutch device.

Owing to judiciously calculated orifices or leakages, it is possible and even advantageous in certain cases, to ensure that the specific pressure in said spaces remains constant. But the important thing is that it be possible, owing to the choice of the orifices or leakages, to obtain any law of variation of pressure, and consequently any curve of variation of the friction force or driving force of the coupling.

Owing to the very small clearances necessary for operation of the device according to the invention, the pressures and consequently the temperatures reached therein may be very high. In order to avoid seizing of the device due to expansion of the parts, the interior of the device should be lubricated, but this lubrication creates a number of problems. Indeed, an excess amount of oil, which is an incompressible fluid, would create instability of the system and therefore an amount of oil must be provided which is just necessary for forming a simple film. Moreover, owing to the high temperatures, the oil burns or at least becomes adversely affected and it must be frequently renewed. Finally, it is well that, in the positive drive position, the excess oil in the corresponding space of the annular chamber be discharged.

In order to meet these requirements, there are formed, in accordance with the invention, in the wall of the annular chamber connected to the driven vane and in a corresponding wall of the case remaining in contact with the first wall, apertures in such positions that they correspond when the driving and driven vanes are in abutment so as to ensure the positive drive and put the residual space remaining between the vanes in communication with the exterior of the case.

The two corresponding walls provided with such apertures may be the surfaces adapted to come into frictional contact, for example the flange carrying the driven vane and the wall of the case.

In the case where the surfaces of contact are constituted by a multidisc assembly, the apertures may be formed in the lateral wall of the case and in a coaxial sleeve connected to the driven vane.

When the driving and driven vanes have such shapes that their surfaces come into abutment throughout their extent, in the positive drive position, that is to say do not leave any residual space therebetween, two pairs of apertures may be provided which are located respectively at the root of the vane of the driven element and in positions of the case which are such that, when the driven vane is in abutment with the driving vane, said apertures are respectively coaxial with the apertures formed at the root of said driven vane located on the side corresponding to its surface which is in abutment.

Preferably, the two pairs of apertures are provided on circles of different diameters of the walls and two other apertures may be provided in the wall of the case so that, when the driven vane is in abutment with the driving vane, said other apertures are respectively coaxial with the apertures formed in the root of said driven vane on the opposite side to the surface then in abutment.

By way of non-limitative examples, two embodiments of the device according to the invention have been shown in the accompanying drawings in which.

Figure 1:
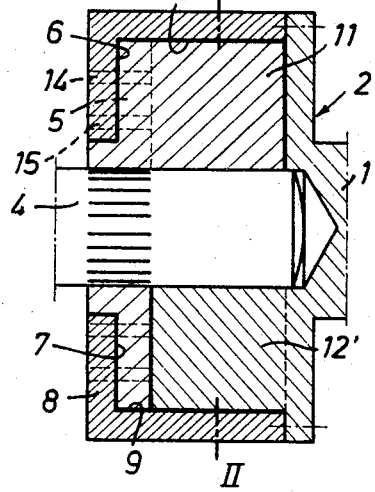
FIG. 1 is an axial sectional view of the device in its most simple embodiment; it corresponds to a sectional view taken on line I—I of FIG. 2.
Figure 2:
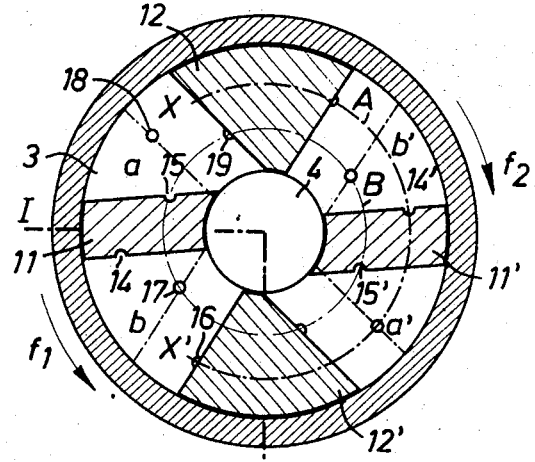
FIG. 2 is a cross-sectional view taken on line II—II of FIG. 1.
Figure 3:
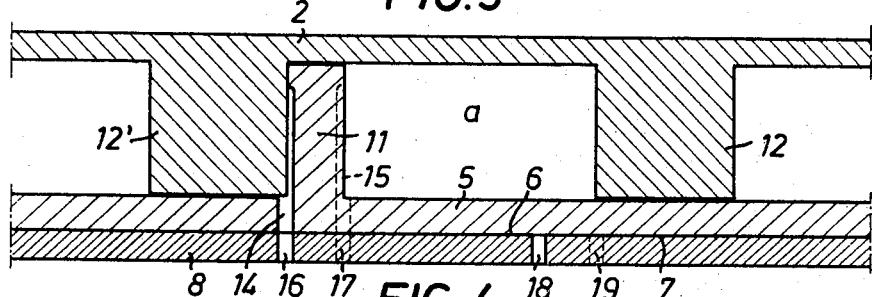
FIGS. 3, 4 and 5 are partial developed views in longitudinal section on the circle A shown in dot-dash line in FIG. 2, these figures corresponding respectively to the position of a driven vane in abutment by one of its surfaces against an intermediate driving vane and in abutment by its other surface.
Figure 4:
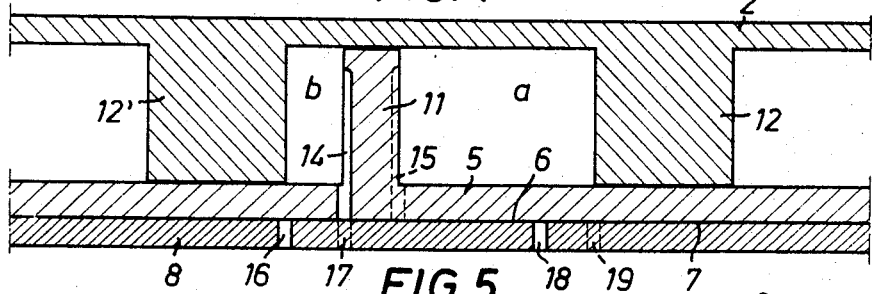
Figure 5:
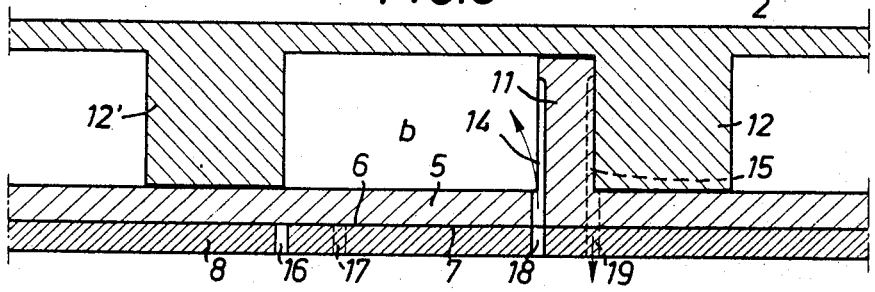

In the embodiment shown in FIGS. 1–5, the device according to the invention comprises a case or bell-shaped element 2 mounted on a driving shaft 1 and defining a chamber 3 into which extends, on the axis of the chamber, a driven shaft 4 or a shaft integral with the driven shaft. Slidably keyed on the shaft 4 is a flange or cheek 5 whose outer surface 6 has a shape corresponding to that of the inner surface 7 of the wall 8 of the case 2. The lateral wall of revolution 9 of the flange 5 is in contact with the inner lateral wall 10 of the case 2 which defines a chamber of revolution 3 filled with air. The flange 5 carries two vanes or blades 11, 11' which are diametrally opposed and extend axially and radially in and are in contact with the inner wall of the case 2 and radially in contact with the shaft 4. Likewise, the case 2 carries two vanes or blades 12, 12' which are diametrally opposed and extend radially to the shaft 4 and axially to the inner surface of the flange 5.

The vanes 11, 11', 12, 12' thus define four spaces $a$, $a'$, $b$, $b'$ of which two are equal and two complementary.

When the assembly comprising the shaft 1 and the case 2 rotates in one direction, for example the direction indicated by the arrow $f_1$, the shaft 4 is driven positively by the contact of the driving vanes 12, 12' and 11, 11' repectively, the volume of the spaces $a$, $a'$ being reduced to zero.

If the direction of rotation of the driving shaft 1 is suddenly reversed so that it rotates in the direction of arrow $f_2$, the vanes 12, 11, on one hand, and the vanes 12', 11', on the other, separate. The volume of the chambers $b$, $b'$ diminishes and causes an increase in the pressure of the air contained therein. This pressure increase tends to oppose the movement of the driven blades 11, 11' driven by the driving vanes 12, 12' and to separate the flange 5 from the case 2 and bring the surface 6 of the flange 5 and the surface 7 of the wall 8 of the case 2 into frictional contact. There is thus produced a frictional driving of the flange 5 and consequently of the driven shaft 4 by the case 2, that is, the driving shaft 1 with a progressive gathering of speed of this shaft 4 until the waves 12, 12' abut the vanes 11, 11' respectively.

Lubrication is achieved by means of a number of orifices formed in the wall 8 of the case 2 and in the flange 5.

Formed in the flange 5 at the root of each vane 11, 11', and on each side of the vanes, are two apertures 14, 15, 14', 15' which are respectively located on circles of different diameters (A) and (B).

Formed in the wall 8 are apertures 16, 17, 18, 19 in the space swept through by the vane 11, and apertures 16', 17', 18', 19' in the space swept through by the vane 11'. The apertures 16 and 17 are so located as to be coaxial with apertures 14 and 15, respectively, when the vane 11 is in abutment with the vane 12' and the apertures 18, 19 are so located as to be respectively coaxial with the apertures 14, 15 when the vane 11 is in abutment with the vane 12. The apertures 16', 17', 18', 19' are arranged in a corresponding manner with respect to the vane 11'.

With the device placed inside a mechanical assembly, it might be considered that it operates in an oily medium, that is to say in a mist of oil.

It can be seen that owing to the disposition of the apertures formed in the flange 5 and wall 8 and to the fact that the surfaces 6 and 7 rub perfectly against each other, there is only a communication between the chamber $a$ or $b$ and the exterior when the vane 11 abuts the vane 12' or 12 respectively.

At the end of travel (FIG. 3 or FIG. 5), the apertures 14, 15 (FIG. 3) or 15 and 19 (FIG. 5) are coaxial and there is a complete discharge of the oil and air remaining in the chamber $b$ or $a$ and the apertures 14, 17 (FIG. 3) or 15, 19 (FIG. 5), being then also coaxial, ensure the entry of the surrounding mist of oil into the chamber $a$ or $b$ and therefore a slight lubrication.

This lubrication is completed upon reversal of the rotation by employing the very high depression which is then produced in the chamber $b$ or $a$.

It must be understood that the assembly of the device may be different from that illustrated. In particular, it may be included in the hub of a conventional reversing system employed in machine tools.

Figure 6:
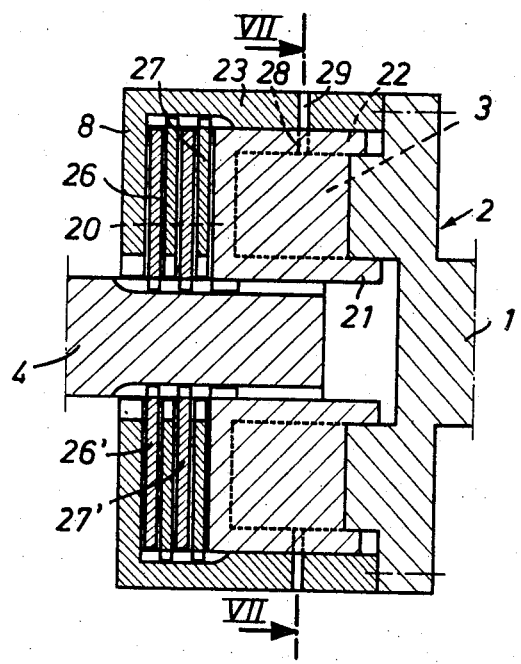
FIG. 6 is an axial sectional view of another embodiment; it corresponds to a sectional view taken on line VI—VI of FIG. 7.
Figure 7:
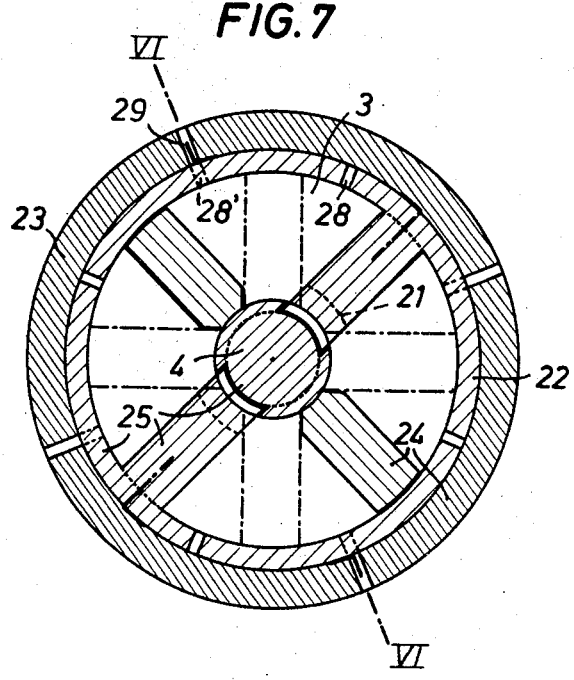
FIG. 7 is a cross-sectional view taken on line VII—VII of FIG. 6.

In the embodiment shown in FIGS. 6 and 7, the case or bell-shaped element 2 is integral with the driving part 4 and defines an inner chamber 3 into which the driven shaft 4 extends on the axis of this chamber. Slidably mounted to rotate with this shaft is a transverse flange 20 integral with two cylindrical sleeves 21, 22 which are in contact throughout their periphery with an inner surface of the lateral wall 23 of the case 2. The driving vanes 24 (only one of which is shown) are integral with the case 2 and the driven vanes 25 (only one of which is shown) are integral with the flange 20 and therefore with the sleeves 21 and 22.

A plurality of parallel discs 26, 27, 26', 27' are mounted between the flange 20 and the interior surface of the wall 8 of the case 2, these discs being alternately slidably keyed to rotate with the lateral wall 23 of the case 2 and with the shaft 4, respectively.

The device just described operates in a similar manner to the embodiment shown in FIGS. 1–5, except that the friction force is here produced by the fact that the plurality of discs 26, 27, 26', 27' come into mutual contact and into contact with the corresponding surfaces of the flange 20 and wall 8. This friction force is therefore multiplied and permits transmission of high torques.

Lubrication in this embodiment is achieved by means of apertures 28, 28' formed in the sleeve 22 and apertures 29 formed in the lateral wall 23 of the case 2. The apertures 28 and 29 are so arranged that they become coaxial when the driving vane 24 abuts the vane 25 (position shown in dot-dash line in FIG. 7). These two apertures 28, 29 then put the residual chamber remaining between the vanes 24 and 25 in communication with the exterior of the case.

What I claim is:

1. A rotary coupling device in which the transmitted speed is increased progressively, of the type comprising a case defining an inner volume of revolution, a shaft axially extending through said volume and defining in said volume an annular chamber filled with fluid, a driving vane, connected to rotate with a driving shaft and extending radially therefrom to form an inner partition wall in said annular chamber, a driven vane, extending axially and radially in the same way as the driving vane and forming in the same way as the driving vane an inner partition wall in said annular chamber and being connected to rotate with the driven shaft, the two corresponding vanes dividing said annular chamber into two complementary spaces, the driven shaft being normally driven positively by the driving shaft by contact between the vanes, whereas a sudden decrease in the speed of rotation or a reversal in direction of the driving shaft produces a depression in one of the volumes and a compression in the other, with a damping of the movement of the driven shaft, wherein the damping fluid is a compressible fluid and at least two means having corresponding surfaces, one of said means being connected to the driving shaft and the other to the driven shaft, and said surfaces coming into frictional contact with each other when the pressure in one of said complementary spaces reaches a given value.

2. A device as claimed in claim 1, wherein the means having the two corresponding surfaces include a transverse flange carrying the driven vane and a corresponding transverse wall of the case.

3. A device as claimed in claim 2, wherein said flange is alidably mounted on the driven shaft to be rotated thereby.

4. A device as claimed in claim 3, in which said means include between the driven flange and the surface of the driving case, a plurality of parallel discs which are alternately mounted to rotate with the driven shaft and with the case but are slidable with respect to the driven shaft and the case forming a multidisc type clutch element.

5. A device as defined in claim 1 in which orifices are judiciously calculated to produce in the annular chamber any law of pressure variation and consequently any curve of variation of the friction force or driving force of the coupling.

6. A device as defined in claim 1 in which apertures are formed in one wall of the annular chamber connected to the driven vane and in a corresponding wall of the case remaining in contact with the first wall, at such positions that they correspond, when the driving and driven vanes are in abutment, to ensure the positive drive and put the residual space remaining between the vanes in communication with the exterior of the case.

7. A device as claimed in claim 6, wherein the two corresponding walls provided with apertures are the surfaces adapted to come into frictional contact.

8. A device as claimed in claim 6, in which the apertures are formed in the lateral wall of the case and in a coaxial sleeve connected to the driven vane.

9. A device as claimed in claim 6, wherein the driving and driven vanes have such shape that their surfaces come into abutment throughout their extent, in the positive drive position, and at least two pairs of apertures are provided which are respectively provided at the root of the vane of the driven element and in positions on the case so that when the driven vane is in abutment with the driving vane said apertures are respectively coaxial with the apertures provided at the root of said driven blade situated on the side corresponding to its surface then in abutment.

10. A device as claimed in claim 9, wherein the two pairs of apertures are provided in the walls on circles of different diameters and two other apertures may be provided in the wall of the case so that, when the driven vane is in abutment with the driving vane, said other apertures are respectively coaxial with the apertures provided at the root of said driven vane on the opposite side to the surface then in abutment.

* * * * *